US010800898B2

(12) United States Patent
Shin et al.

(10) Patent No.: US 10,800,898 B2
(45) Date of Patent: *Oct. 13, 2020

(54) METHOD FOR REPRODUCING POLYESTER CONTAINER AND REPRODUCED POLYESTER CHIP PREPARED THEREFROM

(71) Applicants: SKC INC., Covington, GA (US); SKC CO., LTD., Gyeonggi-do (KR)

(72) Inventors: Daeyong Shin, Sugar Hill, GA (US); Yongdeuk Kim, Jeollanam-do (KR); Jung Kyu Lee, Seoul (KR); Jaehyong Son, Snellville, GA (US); Eugene Jung, Lawrenceville, GA (US)

(73) Assignees: SKC INC., Covington, GA (US); SKC CO., LTD., Gyeonggi-do (KR)

( * ) Notice: Subject to any disclaimer, the term of this patent is extended or adjusted under 35 U.S.C. 154(b) by 25 days.

This patent is subject to a terminal disclaimer.

(21) Appl. No.: 16/355,519

(22) Filed: Mar. 15, 2019

(65) Prior Publication Data
US 2019/0330442 A1    Oct. 31, 2019

Related U.S. Application Data

(60) Provisional application No. 62/664,543, filed on Apr. 30, 2018.

(51) Int. Cl.
| *C08J 11/12* | (2006.01) |
| *C08J 5/18* | (2006.01) |
| *C08G 63/183* | (2006.01) |
| *C08G 63/672* | (2006.01) |

(52) U.S. Cl.
CPC ............. *C08J 11/12* (2013.01); *C08G 63/183* (2013.01); *C08G 63/672* (2013.01); *C08J 5/18* (2013.01); *C08J 2367/02* (2013.01); *C08J 2367/03* (2013.01)

(58) Field of Classification Search
USPC ........................................................ 521/48
See application file for complete search history.

(56) References Cited

U.S. PATENT DOCUMENTS

| 6,342,281 | B2 | 1/2002 | Hayakawa et al. |
| 6,663,929 | B1 | 12/2003 | Tabota et al. |
| 7,128,863 | B2 | 10/2006 | Kim et al. |
| 2005/0196563 | A1 | 9/2005 | Ito et al. |
| 2007/0082157 | A1 † | 4/2007 | Heater et al. |
| 2007/0093615 | A1 † | 4/2007 | Callander et al. |
| 2009/0227735 | A1 * | 9/2009 | Shih ................. C08J 5/18 525/54.21 |
| 2011/0224369 | A1 † | 9/2011 | Kim et al. |
| 2019/0330441 | A1 * | 10/2019 | Shin ................. B29B 17/00 |

FOREIGN PATENT DOCUMENTS

| JP | 2001-058622 | 3/2001 |
| JP | 2003-122256 | 4/2003 |
| JP | 2014-065282 | 4/2014 |
| KR | 10-2002-0049872 | 6/2002 |
| KR | 10-2007-0007058 | 1/2007 |
| KR | 10-0688347 | 3/2007 |
| KR | 10-0981129 | 9/2010 |

OTHER PUBLICATIONS

International Search Report Issued by PCT International Application No. PCT/KR2019/005232 dated Aug. 2, 2019.
Office Action issued by the Australian Patent Office dated Dec. 6, 2019.
Association of Postconsumer Plastic Recyclers, "Champions for Change, Critical Issues Guidance for Innovations, Sleeve Label Substrate for PET Bottles Critical Guidance Document," 20 pages, published Jul. 31, 2012.†
Recycling Today, "APR Releases Document on Full-Sleeve Labels on PET Bottles," 6 pages, published Jul. 31, 2012, available online at http://www.plasticsrecycling.org.†
http://www.Lexico.com, "GRIND definition in English", 5 pages, accessed online Mar. 4, 2020.†

* cited by examiner
† cited by third party

*Primary Examiner* — Terressa Boykin
(74) *Attorney, Agent, or Firm* — IP & T Group LLP

(57) ABSTRACT

A process for regenerating a polyester container and regenerated polyester chips prepared therefrom. The process comprises preparing a polyester container provided with a heat shrinkable film; crushing the container provided with the heat shrinkable film to obtain flakes; and thermally treating the flakes to produce regenerated polyester chips, wherein when the flakes are thermally treated at a temperature of 200° C. to 220° C. for 60 minutes to 120 minutes, the clumping fraction is 5% or less, and the flakes comprise first flakes obtained by crushing the container and second flakes obtained by crushing the heat shrinkable film. It not only solves the environmental problems by improving the recyclability of the polyester container, but also is capable of enhancing the yield and productivity.

15 Claims, 1 Drawing Sheet

METHOD FOR REPRODUCING POLYESTER CONTAINER AND REPRODUCED POLYESTER CHIP PREPARED THEREFROM

The present application claims priority of U.S. Patent Application Ser. No. 62/664,543 filed on Apr. 30, 2018, which is incorporated herein by reference in its entirety.

TECHNICAL FIELD

Embodiments relate to a process for regenerating a polyester container and regenerated polyester chips prepared therefrom, which not only solve the environmental problems by improving the recyclability of the polyester container, but also are capable of enhancing the yield and productivity.

BACKGROUND ART OF THE INVENTION

As concerns about environmental problems have increased in recent years, there is a demand for addressing the recycling issues of products fabricated using thermoplastic polymers. In particular, polyethylene terephthalate, a thermoplastic resin having excellent properties in terms of thermal resistivity, processability, transparency, and non-toxicity, has been widely used for producing a wide range of products such as films, fibers, bottles, and containers, and the like, and efforts have been made to improve the regeneration rate thereof.

In general, a polyolefin stretch film or the like is attached to a container produced from polyethylene terephthalate. Thus, once a container recycled from the consumers is washed and crushed, it is then subjected to liquid specific gravity separation, dehydration, drying, and/or wind specific gravity separation in order to remove a large amount of films contained in the crushed product and then to such an additional step as pelietization to obtain regenerated chips. However, there has been a disadvantage in that the regenerated chips are colored or clumped during the thermal treatment of the regenerated chips due to the inks and the films that have not been removed even after the above steps. Thus in order to increase the regeneration rate of containers, it is important to prevent inks and films from being mixed with the containers.

Accordingly, a method of using a film made of a low specific gravity polymer such as polystyrene, polyethylene, polypropylene, and the like has been proposed in order to readily carry out the specific gravity separation. However, the low specific gravity thereof cannot be effectively achieved due to the influence of the ink layer, which makes it difficult to completely separate the film, and the problem that the residual ink colors the regenerated chips cannot be solved.

DISCLOSURE OF THE INVENTION

Technical Problem to be Solved

Accordingly, embodiments aim to provide a process for regenerating a polyester container capable of effectively separating inks and films during a regeneration process, thereby improving the recyclability of a polyester container, and regenerated polyester chips prepared therefrom.

Solution to the Problem

According to an embodiment, there is provided a process for regenerating a polyester container, which comprises preparing the polyester container provided with a heat shrinkable film comprising a copolymerized polyester resin comprising a diol component and a dicarboxylic acid component; crushing the container provided with the heat shrinkable film to obtain flakes; and thermally treating the flakes to produce regenerated polyester chips, wherein when the flakes are thermally treated at a temperature of 200° C. to 220° C. for 60 minutes to 120 minutes, the clumping fraction is 5% or less, and the flakes comprise first flakes obtained by crushing the container and second flakes obtained by crushing the heat shrinkable film.

Advantageous Effects of the Invention

The process for regenerating a polyester container according to an embodiment improves the recyclability of a polyester container, thereby solving the environmental problems and enhancing the yield and productivity.

In addition, the process for regenerating a polyester container according to an embodiment does not require a separate step of separating the polyester container and a film, thereby saving time and cost.

DETAILED DESCRIPTION FOR CARRYING OUT THE INVENTION

Hereinafter, the present invention will be described in detail with reference to embodiments. The embodiments are not limited to those described below. Rather, they can be modified into various forms as long as the gist of the invention is not altered.

Throughout the present specification, when a part is referred to as "comprising" an element, it is understood that other elements may be comprised, rather than other elements are excluded, unless specifically stated otherwise.

All numbers and expressions relating to quantities of components, reaction conditions, and the like used herein are to be understood as being modified by the term "about" unless specifically stated otherwise.

Process for Regenerating a Polyester Container

According to an embodiment, there is provided a process for regenerating a polyester container, which comprises preparing the polyester container provided with a heat shrinkable film comprising a copolymerized polyester resin comprising a diol component and a dicarboxylic acid component; crushing the container provided with the heat shrinkable film to obtain flakes; and thermally treating the flakes to produce regenerated polyester chips, wherein when the flakes are thermally treated at a temperature of 200° C. to 220° C. for 60 minutes to 120 minutes, the clumping fraction is 5% or less, and the flakes comprise first flakes obtained by crushing the container and second flakes obtained by crashing the heat shrinkable film.

Figure 1:
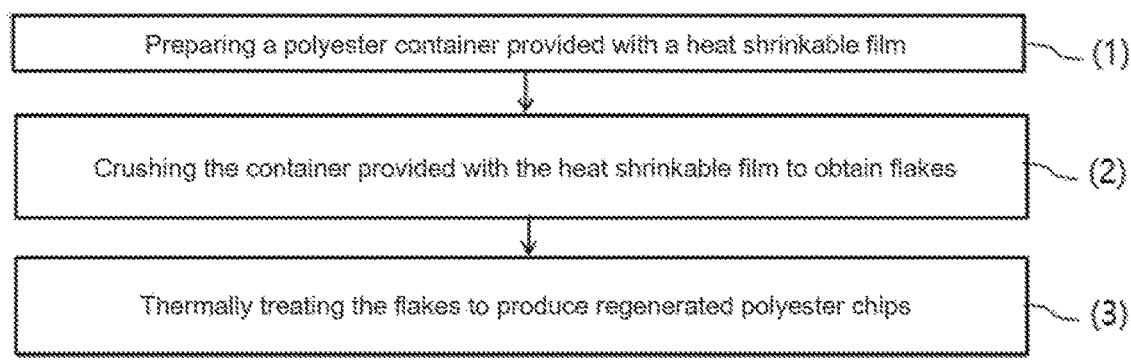
FIG. 1 schematically depicts a process for regenerating a polyester container according to an embodiment.
Figure 2:
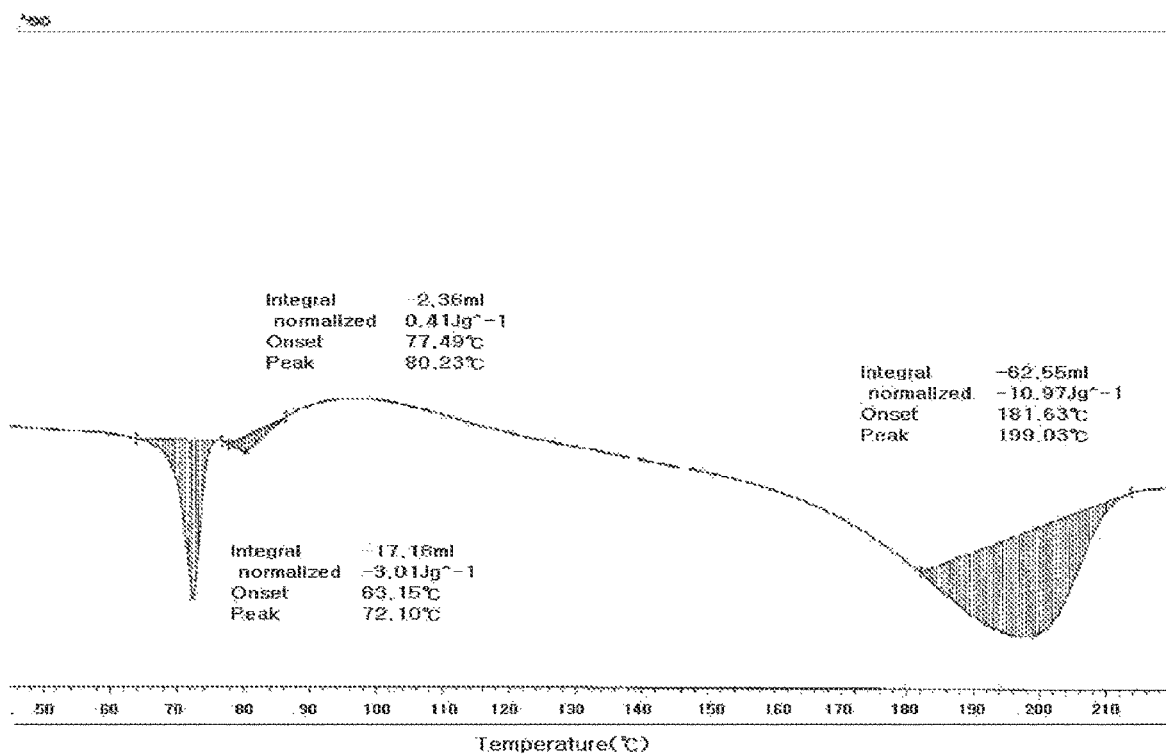
FIG. 2 shows the results of DSC (differential scanning calorimeter) measurement of the heat shrinkable film of Example 1.

FIG. 1 schematically depicts a process for regenerating a polyester container according to an embodiment. Specifically, FIG. 1 illustrates (1) preparing a polyester container provided with a heat shrinkable film; (2) crushing the container provided with the heat shrinkable film to obtain flakes; and (3) thermally treating the flakes to produce regenerated polyester chips.

Step (1)

In step (1), a polyester container provided with a heat shrinkable film is prepared. Specifically, in step (1), a waste polyester container provided with a heat shrinkable film is prepared.

According to an embodiment, the step of preparing a polyester container provided with a heat shrinkable film may comprise covering the outer surface of the container with the heat shrinkable film; and having the heat shrinkable film shrunk. Specifically, the outer surface of the container is covered with the heat shrinkable film, and the heat shrinkable film may be shrunk by steam or hot air to wrap the outer surface of the container. In such event, the heat shrinkable film may have an ink layer formed by a process such as printing before the heat shrinkage.

According to an embodiment, the container may comprise at least 90% by weight of the polyester resin based on the total weight of the container. Specifically, the container may be a container that comprises polyethylene terephthalate and may comprise polyethylene terephthalate in an amount of 90% by weight or more, 95% by weight or more, or 99% by weight or more, based on the total weight of the container.

In general, recycled waste products are intermingled with containers, metals, glass, and plastics. Once the waste products are washed, polyester containers are classified. Then, the container may be subject to a process in which the film covering the container is mechanically torn or cut to be removed. In such event, the quality of the regenerated polyester chips to be produced may be deteriorated due to the residual film and the ink layer formed on the residual film.

In contrast, it is possible to produce regenerated polyester chips from a container provided with a heat shrinkable film according to the embodiment even without an additional process of removing a film Thus, time and cost are saved.

Hereinafter, the heat shrinkable film will be described in detail.

<Heat Shrinkable Film>

According to an embodiment, the copolymerized polyester resin comprises a diol component and a dicarboxylic acid component.

The diol component is composed of a linear or branched $C_2$ to $C_{10}$ diol. That is, the diol component does not comprise an alicyclic diol or an aromatic diol.

For example, the linear or branched $C_2$ to $C_{10}$ diol may comprise a derivative of ethylene glycol, diethylene glycol, neopentyl glycol, 1,3-propanediol, 1,2-1,3-octanediol, 2,3-butanediol, 1,3-butanediol, 1,4-butanediol, 1,5-pentanediol, 2-butyl-2-ethyl-1,3-propanediol, 2,2-diethyl-1,5-pentanediol, 2,4-diethyl-1,5-pentanediol, 3-methyl-1,5-pentanediol, 1,1-dimethyl-1,5-pentanediol, 1,6-hexanediol, 2-ethyl-3-methyl-1,5-hexanediol, 2-ethyl-3-ethyl-1,5-hexanediol, 1,7-heptanediol, 2-ethyl-3-methyl-1,5-heptanediol, 2-ethyl-3-ethyl-1,6-heptanediol, 1,8-octanediol, 1,9-nonanediol, 1,10-decanediol, or a combination thereof. But it is not limited thereto.

According to an embodiment, the diol component may comprise at least one selected from the group consisting of ethylene glycol, diethylene glycol, cyclohexanedimethanol (CHDM), propanediol unsubstituted or substituted with an alkyl group, butanediol unsubstituted or substituted with an alkyl group, pentanediol unsubstituted or substituted with an alkyl group, hexanediol unsubstituted or substituted with an alkyl group, octanediol unsubstituted or substituted with an alkyl group, and a combination thereof.

According to an embodiment, the diol component may comprise ethylene glycol, diethylene glycol, 1,4-cyclohexanedimethanol, 1,3-propanediol, 1,2-octanediol, 1,3-octanediol, 2,3-butanediol, 3-butanediol, 1,4-butanediol, 1,5-pentanediol, neopentyl glycol, 2-butyl-2-ethyl-1,3-propanediol, 2,2-diethyl-1,5-pentanediol, 2,4-diethyl-1,5-pentanediol, 3-methyl-1,5-pentanediol, 1,1-dimethyl-1,5-pentanediol, or a combination thereof.

According to an embodiment, the diol component may be at least one selected from the group consisting of ethylene glycol, diethylene glycol, neopentyl glycol, and cyclohexanedimethanol.

The dicarboxylic acid component may be selected from the group consisting of an aromatic dicarboxylic acid such as terephthalic acid, dimethylterephthalic acid, isophthalic acid, naphthalene dicarboxylic acid, orthophthalic acid, and the like; an aliphatic dicarboxylic acid such as adipic acid, azelaic acid, sebacic acid, decanedicarboxylic acid, and the like; an alicyclic dicarboxylic acid; an ester thereof; and a combination thereof. Specifically, the dicarboxylic acid component may be composed of terephthalic acid, dimethyl terephthalic acid, isophthalic acid, naphthalene dicarboxylic acid, orthophthalic acid, or a combination thereof.

According to an embodiment, the dicarboxylic acid component may comprise an aromatic dicarboxylic acid. For example, the dicarboxylic acid component may comprise at least 80% by mole, at least 90% by mole, or at least 95% by mole of terephthalic acid, based on the total number of moles of the dicarboxylic acid component.

According to an embodiment, the copolymerized polyester resin may comprise neopentyl glycol in an amount of 5 to 35% by mole based on the total number of moles of the diol component. For example, the copolymerized polyester resin may comprise neopentyl glycol in an amount of 5 to 30% by mole, 7 to 30% by mole, 10 to 25% by mole, or 10 to 20% by mole, based on the total number of moles of the diol component. If the above range is satisfied, a heat shrinkable film having a heat shrinkage rate in the direction perpendicular to the main shrinkage direction that is not high even at a high temperature can be prepared. In particular, if the content of neopentyl glycol exceeds the above range, the film may excessively expand in the direction perpendicular to the main shrinkage direction, so that wrinkles or deformation may occur when the film is applied to a container, in addition, if the content of neopentyl glycol is less than the above range, the amorphous region is unnecessarily large, whereby the expansion coefficient would be increased due to low shrinkage characteristics in the direction perpendicular to the main shrinkage direction although the shrinkage characteristics in the main shrinkage direction could be improved.

According to an embodiment, the copolymerized polyester resin may comprise ethylene glycol in an amount of 55 to 93% by mole based on the total number of moles of the diol component. For example, the copolymerized polyester resin may comprise ethylene glycol in an amount of 60 to 90% by mole, 70 to 90% by mole, or 75 to 85% by mole, based on the total number of moles of the diol component. If the above range is satisfied, the heat shrinkage rate can be enhanced, and the clumping fraction can be reduced.

According to an embodiment, the copolymerized polyester resin may comprise diethylene glycol in an amount of 0 to 20% by mole based on the total number of moles of the diol component. For example, the copolymerized polyester resin may comprise diethylene glycol in an amount of 0 to 15% by mole, 1 to 13% by mole, 1 to 10% by mole, or 2 to 10% by mole, based on the total number of moles of the diol component. If the above range is satisfied, the heat shrinkage rate can be enhanced, and the clumping fraction can be reduced.

According to an embodiment, the copolymerized polyester resin may comprise cyclohexanedimethanol in an amount of 0 to 30% by mole based on the total number of moles of the diol component. For example, the copolymerized polyester resin may comprise cyclohexanedimethanol in an amount of 10 to 30% by mole, 20 to 30% by mole, or 22 to 30% by mole, based on the total number of moles of the diol component.

According to an embodiment, the polyester resin comprises a dicarboxylic acid component and a diol component, wherein the dicarboxylic acid component may be composed of terephthalic acid, and the diol component may be composed of (i) neopentyl glycol and (ii) ethylene glycol, diethylene glycol, or a combination thereof. Specifically, the dicarboxylic acid component may be composed of terephthalic acid, and the diol component may be composed of (i) neopentyl glycol and (ii) ethylene glycol. Alternatively, the dicarboxylic acid component may be composed of terephthalic acid, and the diol component may be composed of neopentyl glycol.

If the dicarboxylic acid component in the polyester resin is composed of a terephthalic acid and if the diol component therein is composed of (i) neopentyl glycol and (ii) ethylene glycol, diethylene glycol, or a combination thereof, the polyester resin may have a reduced whitening phenomenon and a low haze of 15% or less and is excellent in dimensional stability.

The diol component may further comprise a monohydric alcohol. For example, it may further comprise isopropyl alcohol. Specifically, the copolymerized polyester resin may comprise a monohydric alcohol in an amount of 15 to 30% by mole, 18 to 25% by mole, or 20 to 25% by mole, based on the total number of moles of the diol component. But it is not limited thereto.

The dicarboxylic acid and the diol as described above are subjected to a transesterification reaction and then polymerization to thereby form a copolymerized polyester resin. Specifically, at least one catalyst selected from manganese acetate, calcium acetate, and zinc acetate may be used as a catalyst for the transesterification reaction. The content of the catalyst may be 0.02 to 0.2% by weight based on the total weight of the dicarboxylic acid compound. Upon completion of the transesterification reaction, at least one additive selected from silica, potassium, and magnesium; a stabilizer such as trimethyl phosphate; a polymerization catalyst selected from antimony trioxide and tetrabutylene titanate; and the like may be selectively added to carry out the reaction, to thereby prepare a copolymerized polyester resin composition.

According to an embodiment, the heat shrinkable film has a heat shrinkage rate of 30% or more in the main shrinkage direction upon thermal treatment at a temperature of 80° C. for 10 seconds. For example, the heat shrinkable film may have a heat shrinkage rate of 40% or more, 45% or more, 50% or more, 30% to 85%, 40% to 80%, or 50% to 80%, in the main shrinkage direction upon thermal treatment at a temperature of 80° C. for 10 seconds Specifically, if the above range is satisfied, it is easy to attach and label the heat shrinkable film on the surface of a container.

According to an embodiment, the heat shrinkable film has a melting point of 190° C. or higher as measured by differential scanning calorimetry. For example, the heat shrinkable film may have a melting point of 185° C. or higher, 180° C. or higher, 175° C. or higher, as measured by differential scanning calorimetry. Specifically, if the above range is satisfied, the clumping fraction can be effectively reduced in the subsequent process.

According to an embodiment, the crystallization temperature of the heat shrinkable film is not measured or is 70° C. to 95° C. by differential scanning calorimetry. For example, the crystallization temperature of the heat shrinkable film may be 70° C. to 93° C., 75° C. to 93° C., or 75° C. to 90° C. by differential scanning calorimetry. In such event, the clumping fraction can be effectively reduced in the subsequent process.

According to an embodiment, the heat of crystallization of the heat shrinkable film may not be measured or may be 0.01 to 50 J/g by differential scanning calorimetry. For example, the heat of crystallization of the heat shrinkable film may be 0.01 to 40 J/g, 0.05 to 30 J/g, 0.1 to 20 J/g, 0.1 to 10 J/g, 0.1 to 8 J/g, or 0.1 to 5 J/g by differential scanning calorimetry. In such event, the clumping fraction can be effectively reduced in the subsequent process.

Specifically, if the melting point of the heat shrinkable film is 190° C. or higher and if the crystallization temperature and the heat of crystallization are not measured by differential scanning calorimeter, the effect of reducing the clumping fraction may be the most excellent.

According to an embodiment, the heat shrinkable film may have a haze of 10% or less. For example, the heat shrinkable film may have a haze of 8% or less, 7% or less, or 5% or less.

According to an embodiment, the heat shrinkable film may have a thickness of 30 to 100 μm. For example, the heat shrinkable film may have a thickness of 30 to 95 μm or 35 to 90 μm. If the above range is satisfied, the shrinkage uniformity is excellent.

<Process for Preparing a Heat Shrinkable Film>

A heat shrinkable film may be prepared from the copolymerized polyester resin composition.

Specifically, the copolymerized polyester resin composition is melt-extruded at 260° C. to 300° C. or 270° C. to 290° C. through a T-die and then cooled to obtain an unstretched sheet. The unstretched sheet is passed through rolls while it is conveyed at a speed of 10 m/min to 110 m/min or 50 m/min to 90 m/min, preheated, and then the stretched to obtain a stretched sheet, which is thermally treated to prepare a heat shrinkable film.

The preheating may be carried out at 90° C. to 120° C. for 0.01 to 1 minute. For example, the preheating temperature (T1) may be 95° C. to 115° C. or 97° C. to 113° C., and the preheating time may be 0.05 to 0.5 minute or 0.08 to 0.2 minute, But it is not limited thereto.

The stretching may be carried out at a temperature lower than the preheating temperature (T1) by at least 20° C. in a first direction or in a second direction perpendicular to the first direction by 3 to 5 times. For example, the stretching may be carried out at a stretching temperature of 60° C. to 90° C., 70° C. to 90° C., or 80° C. to 90° C., in a first direction or in a second direction perpendicular to the first direction by 3 to 4.5 times, 3.5 to 4.5 times, or 4 to 4.5 times. But it is not limited thereto.

In this specification, the first direction may be the longitudinal direction, and the second direction may be the transverse direction. Alternatively, the first direction may be the transverse direction, and the second direction may be the longitudinal direction.

The thermal treatment may be carried out at 70° C. to 95° C. for 0.01 to 1 minute. For example, the thermal treatment temperature (T2) may be 70° C. to 90° C., 70° C. to 85° C., or 70° C. to 80° C., and the thermal treatment time may be 0.05 to 0.5 minute or 0.08 to 0.2 minute But it is not limited thereto.

According to an embodiment, the preheating temperature (T1)-the thermal treatment temperature (T2) may be 10 to 40° C. For example, T1-T2 may be 13° C. to 35° C., 11° C. to 34° C., 15° C. to 34° C., or 20° C. to 34° C. If the above range is satisfied, the shrinkage rate in the main shrinkage direction and the heat shrinkage rate in the direction perpendicular to the main shrinkage direction may be effectively controlled.

Step (2)

In step (2), the container provided with the heat shrinkable film is crushed to obtain flakes. The polyester container classified in the above step (1) comprises a heat shrinkable film, which may be crushed to obtain flakes. In such event, the flakes comprise first flakes obtained by crushing the container and second flakes obtained by crushing the heat shrinkable film.

According to an embodiment, the particle size of the first flakes may be 0.1 to 20 mm, and the particle size of the second flakes may be 0.1 to 20 mm. For example, the particle size of the first flakes may be 0.5 to 15 mm, 1 to 15 mm, or 2 to 10 mm, and the particle size of the second flakes may be 0.5 to 15 mm, 1 to 15 mm, or 2 to 10 mm.

According to an embodiment, the flakes may be washed with a 0.5% to 3% aqueous solution of NaOH at 80° C. to 97° C. for 5 minutes to 30 minutes. A part or all of the ink layer remaining in the flakes may be removed by carrying out the washing.

According to an embodiment, the flakes may be dried at 60° C. to 175° C. for 10 minutes to 30 minutes after the washing step.

Step (3)

In step (3), the flakes are thermally treated to produce regenerated polyester chips.

The thermal treatment may be carried out at 200° C. to 220° C.; for 60 minutes to 120 minutes. For example, it may be carried out at 200° C. to 21.5° C. or 205° C. to 220° C. for 70 minutes to 120 minutes or 80 minutes to 120 minutes.

Regenerated polyester chips that comprise the flakes may be obtained after the thermal treatment step. Specifically, regenerated polyester chips that comprise the first flakes and the second flakes may be obtained. For example, the flakes may be melt-extruded and cut to obtain regenerated polyester chips.

Regenerated Polyester Chips

According to an embodiment, the regenerated polyester chips may have an intrinsic viscosity (IV) of 0.60 dl/g or more. For example, the regenerated polyester chips may have an intrinsic viscosity (IV) of 0.63 dl/g or more, 0.65 dl/g or more, 0.70 dl/g or more, 0.75 dl/g or more, 0.60 to 3.00 dl/g, 0.60 to 2.0 dl/g, or 0.65 to 1.0 dl/g.

According to an embodiment, when the flakes are thermally treated at a temperature of 200° C. to 220° C. for 60 minutes to 120 minutes, the clumping fraction may be 5% or less. For example, when the flakes are thermally treated at a temperature of 200° C. to 220° C. for 60 minutes to 120 minutes, the clumping fraction may be 3% or less, 2.5% or less, 2% or less, or 1% or less. Specifically, the clumping fraction refers to the fraction of aggregates based on the total weight of the flakes. For example, the flakes may be passed through a sieve and thermally treated. Then, the aggregates, which are entangled flakes, may be passed through a sieve again to be separated. In such event, the sieves used can be the same size. That is, the clumping fraction can be measured as a percentage of the aggregate content based on the thermally treated flakes.

In addition, the higher the value of the crumbling fraction is, the more the first flakes and the second flakes are entangled together to lower the quality of the regenerated chips. For example, the size of the aggregates may be at least three times the particle size of the flakes. The second flakes are obtained by crushing the heat shrinkable film according to the embodiment, thereby effectively reducing or preventing the clumping, phenomenon and enhancing the quality of the regenerated polyester chips.

According to an embodiment, the regenerated polyester chips may comprise first flakes that comprise polyethylene terephthalate and second flakes that comprise a copolymerized polyester resin.

According to an embodiment, the regenerated polyester chips may comprise 70 to 99% by weight of polyethylene terephthalate and 1 to 30% by weight of a copolymerized polyester resin based on the total weight of the regenerated polyester chips. For example, the regenerated polyester chips may comprise 80 to 99% by weight, 90 to 99% by weight, or 95 to 99% by weight of polyethylene terephthalate and 1 to 28% by weight or 3 to 25% by weight of a copolymerized polyester resin based on the total weight of the regenerated polyester chips.

According to an embodiment, the copolymerized polyester resin may comprise neopentyl glycol in an amount of 5 to 35% by mole based on the total number of moles of the diol component and terephthalate in an amount of at least 90% by mole based on the total number of moles of the dicarboxylic acid component. For example, the copolymerized polyester resin may comprise neopentyl glycol in an amount of 5 to 30% by mole, 10 to 30% by mole, or 10 to 25% by mole, based on the total number of moles of the diol component and terephthalate in an amount of at least 93% by mole, at least 95% by mole, at least 98% by mole, or at least 99% by mole, based on the total number of moles of the dicarboxylic acid component.

According to an embodiment, the copolymerized polyester resin may comprise ethylene glycol in an amount of 55 to 93% by mole and diethylene glycol in an amount of 2 to 10% by mole based on the total number of moles of the diol component. For example, the copolymerized polyester resin may comprise ethylene glycol in an amount of 60 to 90% by mole, 65 to 90% by mole, or 65 to 85% by mole and diethylene glycol in an amount of 2 to 8% by mole or 3 to 8% by mole based on the total number of moles of the diol component.

Hereinafter, the present invention will be described in more detail with reference to the following examples. However, these examples are set forth to illustrate the present invention, and the scope of the present invention is not limited thereto.

Example 1

<Preparation of a Copolymerized Polyester Resin

A stainless steel autoclave equipped with a stirrer, a thermometer, and a partial reflux condenser was charged with 100% by mole of dimethyl terephthalate (MIT), 80% by mole of ethylene glycol (EG), 15% by mole of neopentyl glycol (NPG), and 5% by mole of diethylene glycol (EG). Then, 0.05% by mole (based on the acid component) of zinc acetate as a transesterification catalyst was added thereto. The transesterification reaction was carried out while methanol was being distilled off. Thereafter, 0.025% by mole (based on the acid component) of antimony trioxide as a polycondensation catalyst was added, and the polycondensation reaction was carried out under a reduced pressure of 26.6 Pa (0.2 Torr) at 280° C. to obtain a copolymerized polyester resin.

<Preparation of a Heat Shrinkable Film>

The copolymerized polyester resin was fed to an extruder and then melt-extruded at 280° C. through a T-die. Thereafter, it was wound around a rotating metal roll whose surface temperature was cooled to 30° C. to obtain an unstretched film having a thickness of 204 μm. Here, the take-up speed (rotation speed of the metal roll) of the unstretched film was 54 m/min.

The unstretched film was continuously wound around a plurality of rotating rolls heated to 60° C. and preheated. The longitudinally stretched film was stretched 5 times in the transverse direction at 96° C.

Thereafter, the film was annealed in the second direction while it was heated to 81° C. using an infrared heater to obtain a heat shrinkable film having a thickness of 41 μm.

<Preparation of a Container Provided with a Heat Shrinkable Film>

The outer surface of a polyethylene terephthalate container (PET container, 30 g) was wrapped with the heat shrinkable film (1 g) prepared above. The heat shrinkable film was shrunk in hot air at a temperature of 90° C. to obtain a container provided with a heat shrinkable film.

<Process for Regenerating a Container>

The container provided with the heat shrinkable film was crushed with a crusher to obtain flakes. The flakes were washed with water and then washed for 15 minutes with a corrosion washing solution (a mixture of a solution of 0.3% by weight of Triton X-100 and a solution of 1.0% by weight of NaOH) stirred in a water bath at 85° C. to 90° C. at 880 rpm.

Thereafter, the flakes were washed with water at room temperature to remove the residual corrosion washing solution, dried at 160° C. for 20 minutes, and then thermally treated at 210° C. to produce regenerated polyester chips.

Examples 2 to 4 and Comparative Example 1

Regenerated polyester chips were prepared in the same manner as in Example 1, except that the components and contents were changed as shown in Table 1 below.

TABLE 1

| | DMT (% by mole) | EG (% by mole) | NPG (% by mole) | DEG (% by mole) | CHDM (% by mole) | Stretching temperature in the transverse direction (° C.) | Heat-setting temperature (° C.) |
|---|---|---|---|---|---|---|---|
| Ex. 1 | 100 | 80 | 15 | 5 | — | 96 | 81 |
| Ex. 2 | 100 | 75 | 20 | 5 | — | 96 | 81 |
| Ex. 3 | 100 | 70 | 25 | 5 | — | 96 | 81 |
| Ex. 4 | 100 | 70 | 30 | 5 | — | 96 | 81 |
| C. Ex. 1 | 100 | 70 | — | 5 | 25 | 96 | 81 |

* CHDM: cyclohexanedimethanol

Evaluation Example 1

Evaluation of Heat Shrinkage Rates

The heat shrinkable films prepared above (300 mm×15 mm) was immersed in a water bath heated to 80° C. and 90° C. for 10 seconds, respectively. After water was removed at room temperature, the heat shrinkage rate was calculated by the following equation.

Heat shrinkage rate (%)=[(300−length of film sample upon thermal treatment (mm)/300]×100

Evaluation Example 2

Evaluation of Tg, Tc, Tm, and Heat of Crystallization

The endotherm and exotherm of the heat shrinkable films (10 mg) prepared above were each measured with Differential Scanning calorimetry-Mettler Toledo DSC 1 while the temperature was raised at a rate of 10° C./min from 30° C. to 250° C. The first endothermic temperature was a glass transition temperature (Tg), the exothermic temperature measured after the Tg was a crystallization temperature (Tc), and the endothermic temperature measured after the Tc was a melting point (Tm) in the measurement result. The integral at Tc was calculated as the heat of crystallization. The larger the value of the heat of crystallization, the faster the crystallization rate and the higher the transfer rate to a crystalline phase.

Evaluation Example 3

Evaluation of Clumping 1 kg of the flakes prepared above was exposed in an oven at 210° C. for 90 minutes without pressure. They were cooled to room temperature and passed through a 625"-sieve. The weight of the aggregates thus filtered was measured and calculated as a percentage of the total weight of the flakes.

Evaluation Example 4

Evaluation of Intrinsic Viscosity

The regenerated polyester chips prepared above were dissolved in ortho-chlorophenol at 100° C., and the intrinsic viscosity (IV) was measured with an Ostwald viscometer at 35° C. in a thermostatic bath by measuring the time for the sample to drop.

The results of Evaluation Examples 1 to 4 are shown in Table 2 below.

TABLE 2

| | Heat shrinkage rate in the transverse direction (80° C.) | Heat shrinkage rate in the transverse direction (90° C.) | Tc ° C. | Tm ° C. | Heat of crystallization (J/g) | Clumping (%) | Intrinsic viscosity (dl/g) |
|---|---|---|---|---|---|---|---|
| Ex. 1 | 58% | 70% | — | 199 | — | 0.02 | 0.76 |
| Ex. 2 | 63% | 72% | — | 178 | — | 0.15 | 0.80 |
| Ex. 3 | 65% | 78% | — | 171 | 0.3 | 1.3 | 0.78 |
| Ex. 4 | 66% | 79% | — | 172 | 1.2 | 4.0 | 0.79 |
| C. Ex. 1 | 68% | 78% | 82 | 166 | 0.1 | 9.7 | 0.76 |

As shown in Table 2, the regenerated polyester chips prepared in the Examples according to the process for regenerating a polyester container had a low clumping fraction and were excellent in all of the heat of crystallization and intrinsic viscosity characteristics.

The invention claimed is:

1. A process for regenerating a polyester container, which comprises preparing the polyester container provided with a heat shrinkable film comprising a copolymerized polyester resin comprising a diol component and a dicarboxylic acid component;
   crushing the container provided with the heat shrinkable film to obtain flakes; and
   thermally treating the flakes to produce regenerated polyester chips,
   wherein when the flakes are thermally treated at a temperature of 200° C. to 220° C. for 60 minutes to 120 minutes, the clumping fraction is 5% or less; and
   the flakes comprise first flakes obtained by crushing the container and second flakes obtained by crushing the heat shrinkable film.

2. The process for regenerating a polyester container of claim 1, wherein the particle size of the first flakes is 0.1 to 20 mm, and the particle size of the second flakes is 0.1 to 20 mm.

3. The process for regenerating a polyester container of claim 1, which comprises washing the flakes prior to the thermal treatment of the flakes.

4. The process for regenerating a polyester container of claim 1, wherein the container comprises polyethylene terephthalate in an amount of 90% by weight or more.

5. The process for regenerating a polyester container of claim 1, wherein the copolymerized polyester resin comprises neopentyl glycol in an amount of 5 to 35% by mole based on the total number of moles of the diol component and terephthalate in an amount of at least 90% by mole based on the total number of moles of the dicarboxylic acid component.

6. The process for regenerating a polyester container of claim 1, wherein the copolymerized polyester resin comprises ethylene glycol in an amount of 55 to 93% by mole and diethylene glycol in an amount of 2 to 10% by mole based on the total number of moles of the diol component.

7. The process for regenerating a polyester container of claim 1, wherein the heat shrinkable film has a melting point of 190° C. or higher as measured by differential scanning calorimetry.

8. The process for regenerating a polyester container of claim 1, wherein the crystallization temperature of the heat shrinkable film is not measured or is 70° C. to 95° C. by differential scanning calorimetry.

9. The process for regenerating a polyester container of claim 1, wherein the step of preparing the polyester container comprises covering the outer surface of the container with the heat shrinkable film; and having the heat shrinkable film shrunk, and
   the heat shrinkable film has a heat shrinkage rate of 30% or more in the main shrinkage direction upon thermal treatment at a temperature of 80° C. for 10 seconds.

10. Regenerated polyester chips prepared according to the regeneration process of claim 1.

11. The regenerated polyester chips of claim 10, which comprise first flakes that comprise polyethylene terephthalate and second flakes that comprise the copolymerized polyester resin.

12. The regenerated polyester chips of claim 11, which comprise 70 to 99% by weight of polyethylene terephthalate and 1 to 30% by weight of the copolymerized polyester resin based on the total weight of the regenerated polyester chips.

13. The regenerated polyester chips of claim 11, wherein the copolymerized polyester resin comprises neopentyl glycol in an amount of 5 to 35% by mole based on the total number of moles of the diol component and terephthalate in an amount of at least 90% by mole based on the total number of moles of the dicarboxylic acid component.

14. The regenerated polyester chips of claim 11, wherein the copolymerized polyester resin comprises ethylene glycol in an amount of 55 to 93% by mole and diethylene glycol in an amount of 2 to 10% by mole based on the total number of moles of the diol component.

15. The regenerated polyester chips of claim 10, which have an intrinsic viscosity (IV) of 0.60 dl/g or more.

\* \* \* \* \*

UNITED STATES PATENT AND TRADEMARK OFFICE
CERTIFICATE OF CORRECTION

PATENT NO.        : 10,800,898 B2                             Page 1 of 1
APPLICATION NO.   : 16/355519
DATED             : October 13, 2020
INVENTOR(S)       : Daeyong Shin et al.

It is certified that error appears in the above-identified patent and that said Letters Patent is hereby corrected as shown below:

In Column 10, Line 52, "625"" should be changed to --0.625"--.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*